(12) United States Patent
Hada et al.

(10) Patent No.: US 10,916,224 B2
(45) Date of Patent: Feb. 9, 2021

(54) HEAD-UP DISPLAY DEVICE

(71) Applicant: NIPPON SEIKI CO., LTD., Niigata (JP)

(72) Inventors: Makoto Hada, Niigata (JP); Yuki Masuya, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 16/343,355

(22) PCT Filed: Nov. 6, 2017

(86) PCT No.: PCT/JP2017/039945
§ 371 (c)(1),
(2) Date: Apr. 18, 2019

(87) PCT Pub. No.: WO2018/088360
PCT Pub. Date: May 17, 2018

(65) Prior Publication Data
US 2019/0244587 A1 Aug. 8, 2019

(30) Foreign Application Priority Data
Nov. 8, 2016 (JP) ................. 2016-218276

(51) Int. Cl.
*G09G 5/00* (2006.01)
*G09G 5/38* (2006.01)
(Continued)

(52) U.S. Cl.
CPC .............. *G09G 5/38* (2013.01); *B60K 35/00* (2013.01); *G01D 7/00* (2013.01); *G01D 7/06* (2013.01);
(Continued)

(58) Field of Classification Search
USPC ...................... 345/7, 8, 9; 359/633
See application file for complete search history.

(56) References Cited

U.S. PATENT DOCUMENTS 9,401,050 B2 * 7/2016 Cajigas ............... G09G 5/00
345/7
9,519,148 B2 * 12/2016 Masuda ............. G02B 27/0149
345/8
(Continued)

FOREIGN PATENT DOCUMENTS

JP  2003-237412 A  8/2003
JP  2008-268485 A  11/2008
(Continued)

OTHER PUBLICATIONS

International Search Report issued in corresponding International Patent Application No. PCT/JP2017/039945, dated Feb. 13, 2018, with English Translation.

*Primary Examiner* — Thuy N Pardo
(74) *Attorney, Agent, or Firm* — McDermott Will & Emery LLP

(57) ABSTRACT

A head-up display (HUD) device displays a first virtual image in an area in which the first virtual image can be displayed, and displays a second virtual image in an area in which the second virtual image can be displayed. The HUD device includes: a rotation driving unit which changes an angle formed between the area in which the first virtual image can be displayed, and the area in which the second virtual image can be displayed; and a control unit which performs virtual image angle adjustment processing for adjusting the angle using the rotation driving unit, and, when performing the virtual image angle adjustment processing, virtual image position changing processing in which the position of the second virtual image in the area in which the second virtual image can be displayed is changed to inhibit (Continued)

deviation in the relative positional relationship between the first and second virtual images.

7 Claims, 11 Drawing Sheets

(51) Int. Cl.
  *G02B 27/01* (2006.01)
  *B60K 35/00* (2006.01)
  *G01D 7/00* (2006.01)
  *G09G 5/36* (2006.01)
  *G01D 7/06* (2006.01)

(52) U.S. Cl.
  CPC ......... *G02B 27/01* (2013.01); *G02B 27/0179* (2013.01); *G09G 5/00* (2013.01); *G09G 5/36* (2013.01); *B60K 2370/1529* (2019.05); *B60K 2370/23* (2019.05); *B60K 2370/31* (2019.05); *B60K 2370/334* (2019.05); *B60K 2370/52* (2019.05); *G02B 2027/0183* (2013.01); *G09G 2354/00* (2013.01)

(56) References Cited

U.S. PATENT DOCUMENTS

| 10,769,831 | B2* | 9/2020 | Shimoda | G02B 27/01 345/9 |
| 2013/0265646 | A1 | 10/2013 | Sakai | |
| 2014/0091988 | A1* | 4/2014 | Masuda | G02B 27/0149 345/7 |
| 2016/0187648 | A1* | 6/2016 | Chou | G02B 27/0101 359/633 |
| 2019/0361243 | A1* | 11/2019 | Tsai | G02F 1/137 345/8 |

FOREIGN PATENT DOCUMENTS

| JP | 2012-037241 A | 2/2012 |
| JP | 2013-214008 A | 10/2013 |
| WO | 2016/181749 A1 | 11/2016 |

\* cited by examiner

[FIG.1]
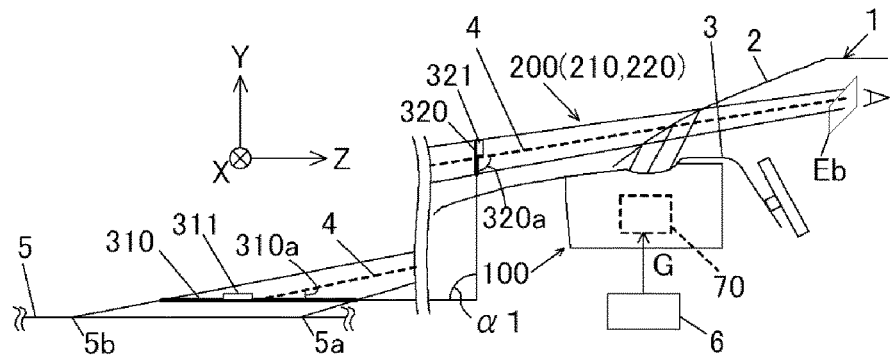
[FIG.2]
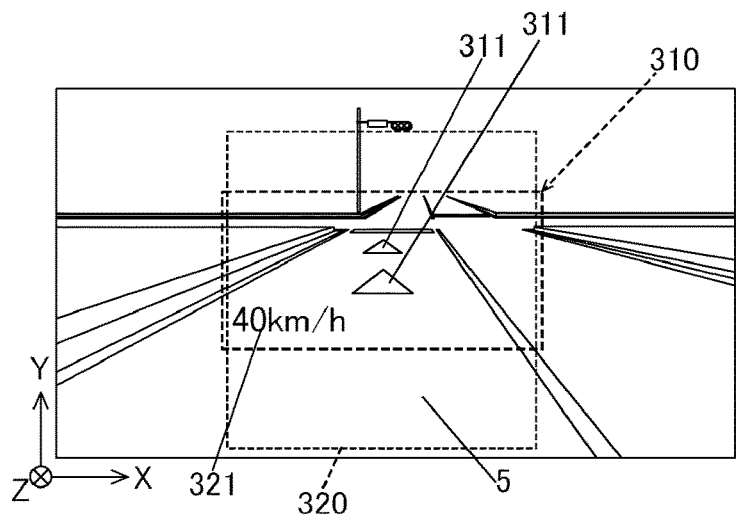
[FIG.3]
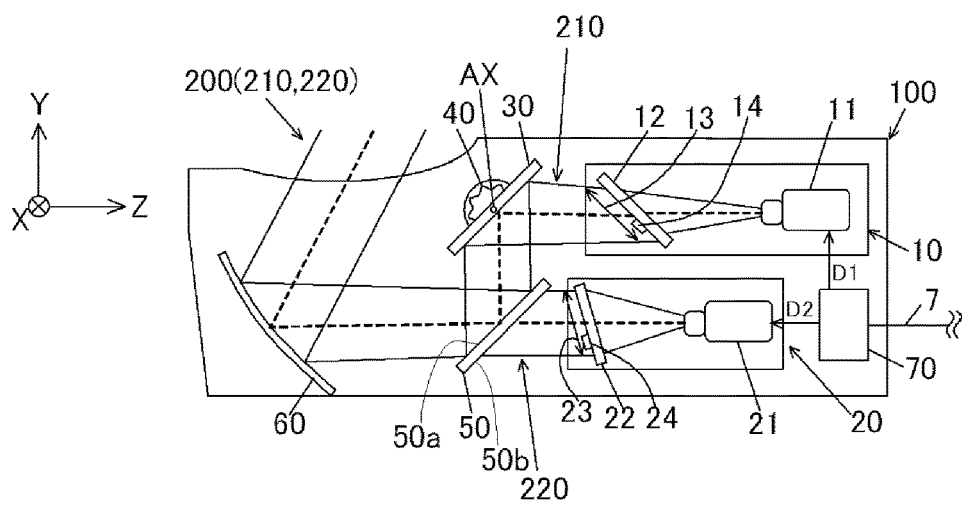

[FIG.4]
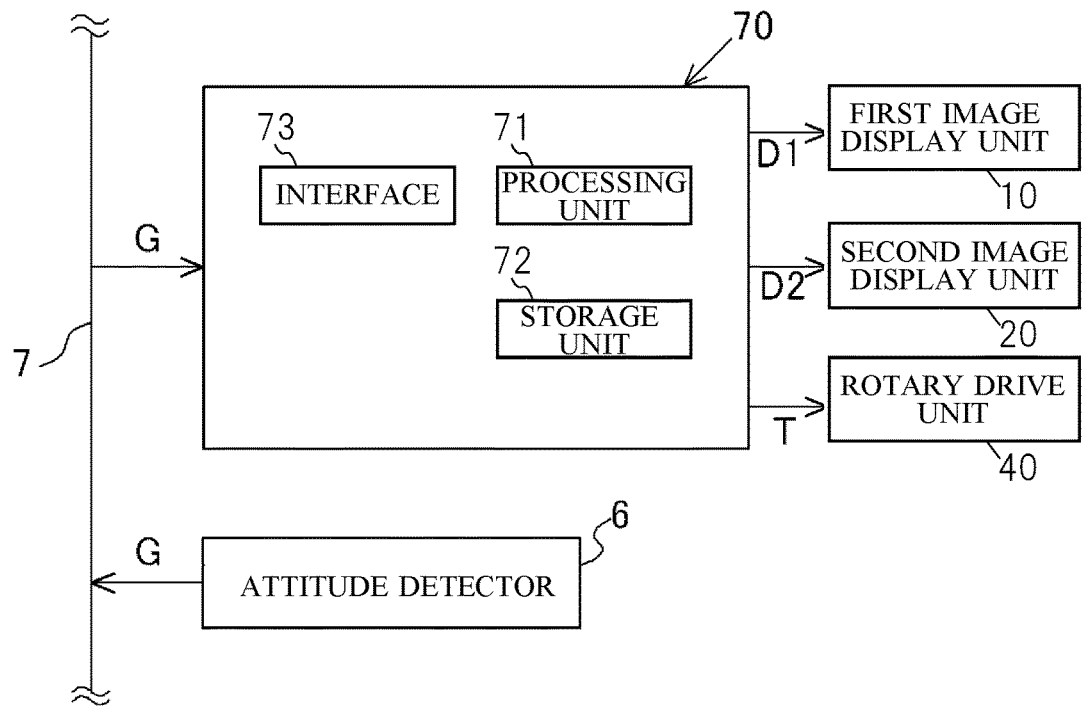
[FIG.5]
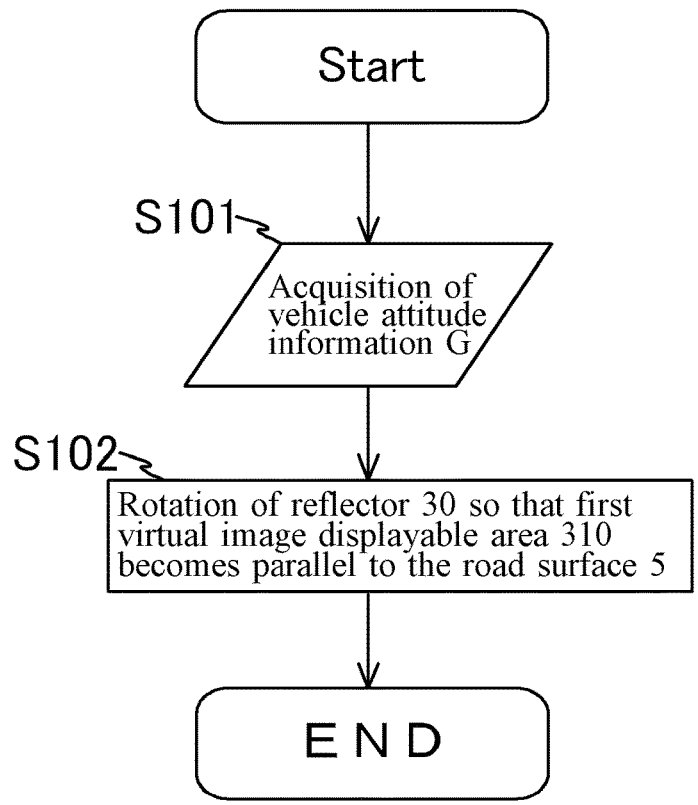

[FIG.6]
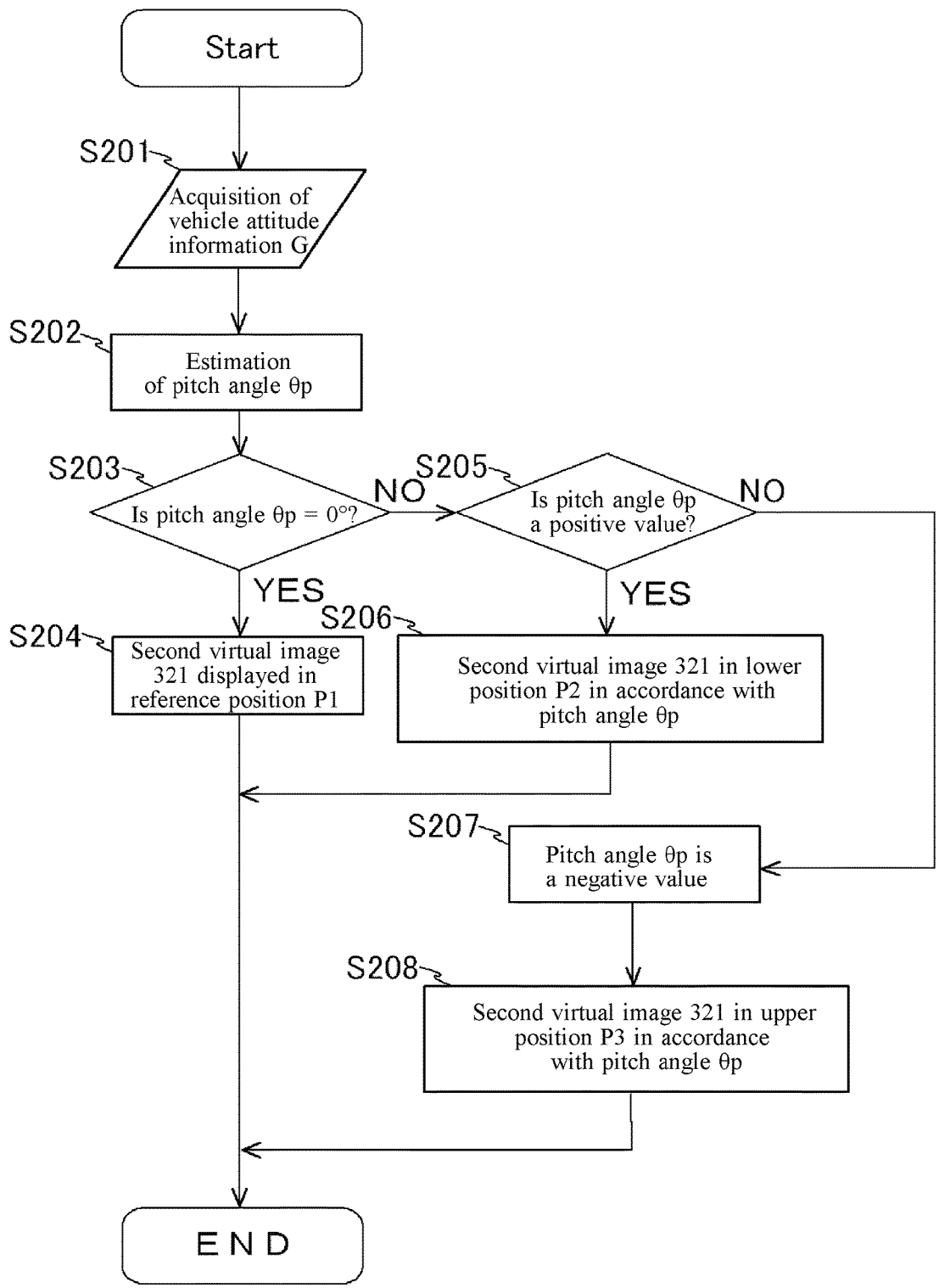

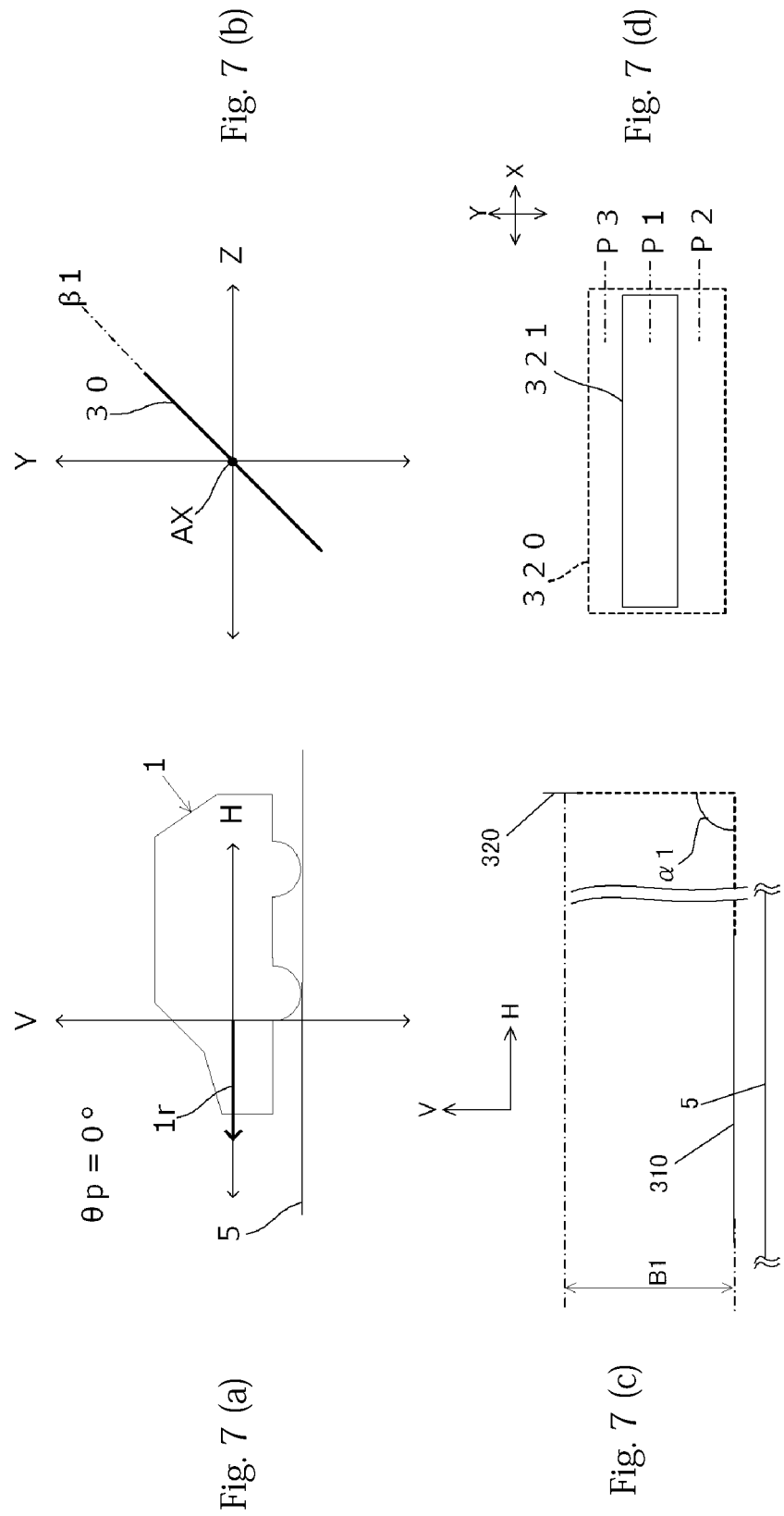

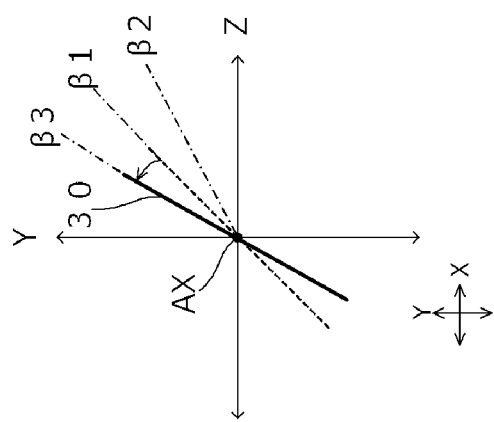
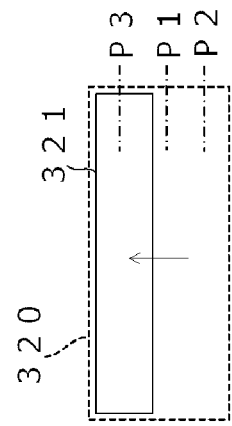
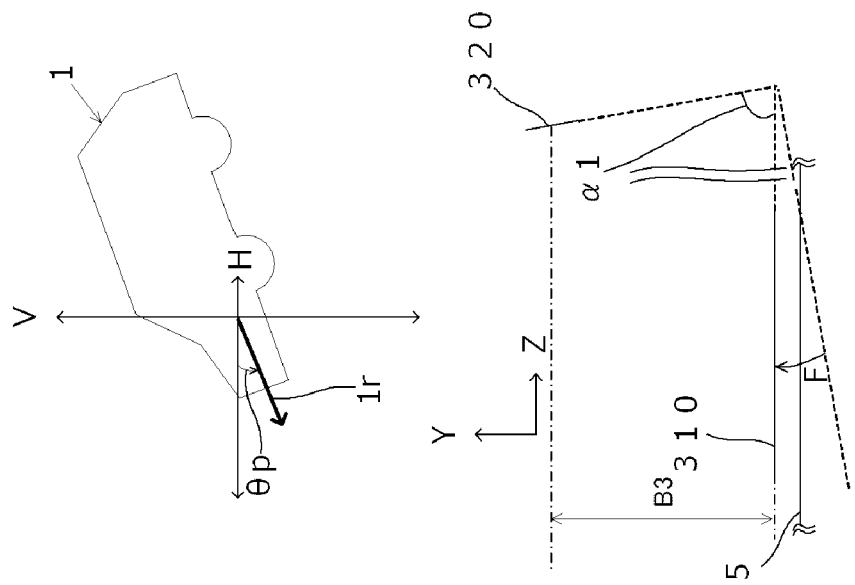
Fig. 9 (a)
Fig. 9 (b)
Fig. 9 (c)
Fig. 9 (d)

[FIG.12]

[FIG.14]
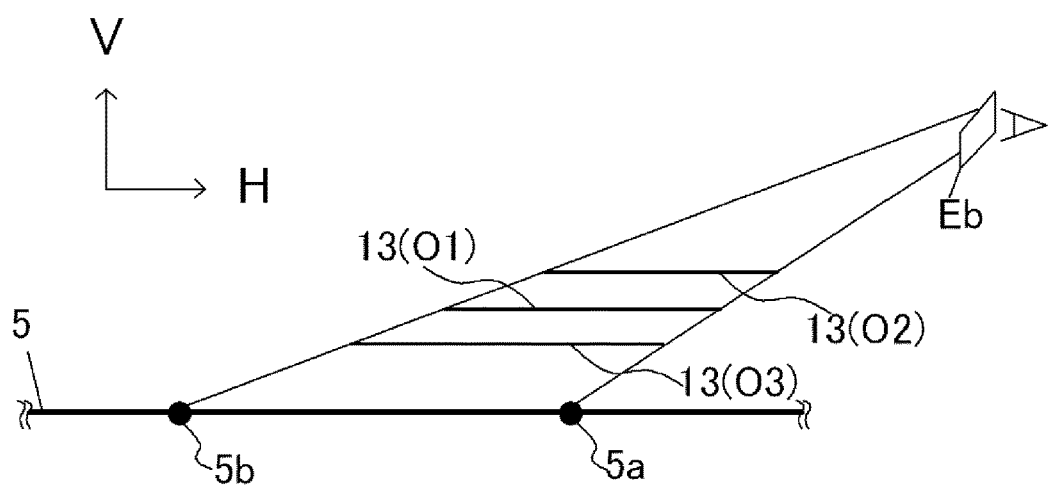

HEAD-UP DISPLAY DEVICE

CROSS REFERENCE

This application is the U.S. National Phase under 35 U.S.C. § 371 of International Application No. PCT/JP2017/039945, filed on Nov. 6, 2017, which claims the benefit of Japanese Application No. 2016-218276, filed on Nov. 8, 2016, the entire contents of each are hereby incorporated by reference.

TECHNICAL FIELD

The present disclosure relates to a head up display device.

BACKGROUND ART

A head up display device which overlaps and displays an image on an actual scene is conventionally known. This head up display device generates an Augmented Reality (AR) which adds information and the like to the actual scene and emphasizes a specific object in the actual scene, and can accurately provide desired information to a viewer while suppressing the movement of a line of sight of the viewer.

For example, a head up display device described in JP-A-2012-037241 comprises two displays for emitting respective display lights, an optical element for transmitting one of the two display lights, and reflecting the other display light, and a magnifying mirror for expanding while reflecting the two display lights passing through this optical element toward the windshield. The viewer receives the two display lights reflected by the windshield, and can visually recognize two virtual images at distance parts of the windshield. JP-A-2012-037241 discloses the configuration in which the distance between two virtual images is changed by moving either of the two displays along the optical axis of the display light emitted by the display itself.

PRIOR ART DOCUMENT

Patent Document

Patent Literature 1: JP-A-2012-037241

SUMMARY OF THE INVENTION

Problems to be Solved by the Invention

However, the angle between the two virtual images is fixed in the head up display described in JP-A-2012-037241. Therefore, for example, there was the risk that the angle of the virtual image will become misaligned with respect to an actual scene due to the condition of the vehicle and the road surface, and accordingly, there was the risk that the stereoscopic impression is diminished due to the virtual image. Therefore, a display of a virtual image which is more suitable for the actual scene has been desired.

In view of the aforementioned circumstances, it is the object of the present disclosure to provide a head up display device for displaying a virtual image more suitable for the actual scene.

Solution to Problem

In order to attain the aforementioned object, a head up display device according to the present disclosure for displaying a first virtual image in a first virtual image displayable area, and displaying a second virtual image in a second virtual image displayable area, comprises an angle varying unit for changing an angle formed by the first virtual image displayable area and the second virtual image displayable area, and a control unit for performing a virtual image angle adjustment process for adjusting the angle through the angle varying unit, and a virtual image position change process for changing at least one of the position of the first virtual image in the first virtual image displayable area and the position of the second virtual image in the second virtual image displayable area in order to suppress misalignment of the relative positional relationship of the first virtual image and the second virtual image when performing the virtual image angle adjustment process.

Effect of the Invention

The present disclosure can display a virtual image which is more suitable for the actual scene.

BRIEF DESCRIPTION OF THE DRAWINGS

FIG. 1 is a pattern diagram of the vehicle on which a display device according to an embodiment of the present disclosure is mounted.

FIG. 2 is a front elevation view illustrating an actual scene and a first and second virtual image displayed by a head up display according to an embodiment of the present disclosure when seen from the viewer.

FIG. 3 is a schematic diagram illustrating a configuration of the head up display device according to an embodiment of the present disclosure.

FIG. 4 is a block diagram illustrating an electrical configuration of the head up display device according to an embodiment of the present disclosure.

FIG. 5 is a flowchart illustrating a process procedure of a virtual image angle adjustment process by a control unit according to an embodiment of the present disclosure.

FIG. 6 is a flowchart illustrating a process procedure of a virtual image position change process by a control unit according to an embodiment of the present disclosure.

FIG. 7 (*a*) is a graph illustrating a pitch angle of the vehicle, FIG. 7. (b) is a graph illustrating the angle of a reflector, FIG. 7 (*c*) is a side view illustrating the arrangement of the first and the second virtual image displayable area, and FIG. 7 (*d*) is a front elevation view illustrating the position of a second virtual image in the second virtual image displayable area when the pitch angle of the vehicle is 0° according to an embodiment of the present disclosure.

FIG. 9 (*a*) is a graph illustrating a pitch angle of the vehicle, FIG. 9 (*b*) is a graph illustrating the angle of a reflector, FIG. 9 (*c*) is a side view illustrating the arrangement of the first and the second virtual image displayable area, and FIG. 9 (*d*) is a front elevation view illustrating the position of a second virtual image in the second virtual image displayable area when the pitch angle of the vehicle is a negative value according to an embodiment of the present disclosure.

FIG. 14 is a schematic diagram illustrating an area to be used of the first screen according a modified example of the present disclosure.

MODE FOR CARRYING OUT THE INVENTION

Figure 8:
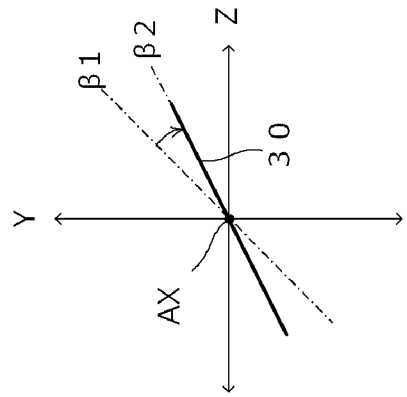
FIG. 8 (*a*) is a graph illustrating a pitch angle of the vehicle, FIG. 8 (*b*) is a graph illustrating the angle of a reflector, FIG. 8 (*c*) is a side view illustrating the arrangement of the first and the second virtual image displayable area, and FIG. 8 (*d*) is a front elevation view illustrating the position of a second virtual image in the second virtual image displayable area when the pitch angle of the vehicle is a positive value according to an embodiment of the present disclosure.
Figure 8:
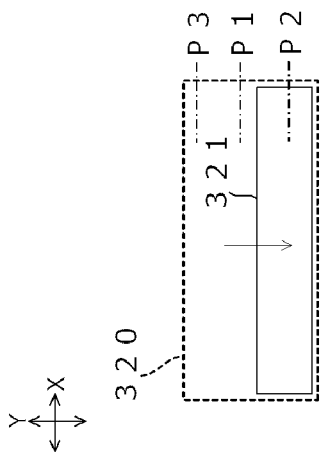
Figure 8:
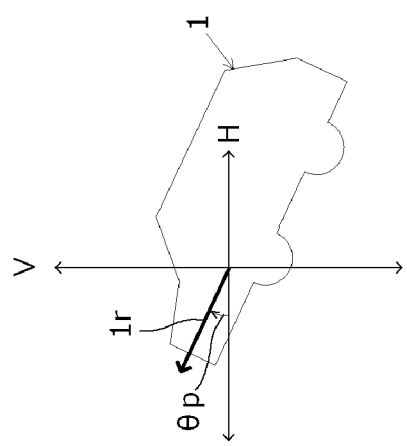
Figure 8:
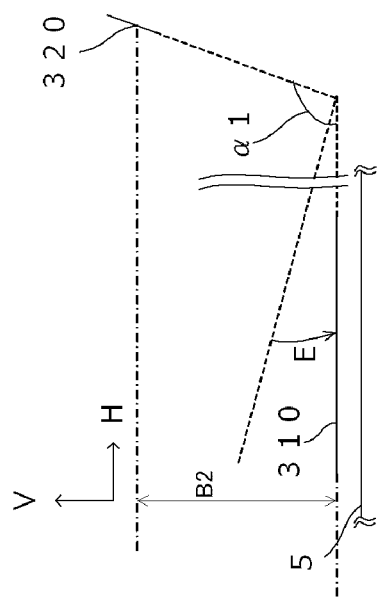

An embodiment of the head up display (HUD) device according to the present disclosure will be explained with reference to the drawings. In the present embodiment, the width direction of the vehicle is defined as the X direction, the front-rear direction of the vehicle is defined as the Z direction, and the height direction of the vehicle is defined as the Y direction.

As shown in FIG. 1, for example, a HUD 100 is housed in a dashboard 3 of a vehicle 1. For example, the HUD device 100 projects a display light 200 indicating vehicle information and the like onto a part of a front windshield 2 of the vehicle 1. The display light 200 is constituted from first and second display lights 210 and 220. A front windshield 2 generates an eye box Eb by reflecting the first and the second display lights 210 and 220 toward a viewer (for example, a driver) side. By placing a viewpoint in the eye box, the viewer can visually recognize a first virtual image 311 in accordance with the first display light 210 and a second virtual image 321 in accordance with the second display light 220 in the front of the front windshield 2.

As shown in FIG. 1 and FIG. 2, the HUD device 100 displays a first virtual image 311 in a first virtual image displayable area 310, and displays a second virtual image 321 in a second virtual image displayable area 320.

The first virtual image displayable area 310 is an area which is virtually set as viewed from the viewer, and is referred to as the range capable of displaying the first virtual image 311. As shown in FIG. 1, the first virtual image displayable area 310 intersects a line of sight 4 from the viewer at a small angle compared to the second virtual image displayable area 320. The first virtual image displayable area 310 is along a road surface 5 as viewed from the viewer. Therefore, the first virtual image displayable area 310 over-laps the road surface 5 over a predetermined range (for example, from a position 5*a* to a position 5*b* of FIG. 1) as viewed from the viewer.

As an example, the first virtual image displayable area 310 is provided in a range over the front direction from the eye box Eb, i.e., from the position 5*a* which is 20 m away from the traveling direction of the vehicle 1 to the position 5*b* which is 50 m away from the position 5*a*. In the present example, the first virtual image 311 is a signal showing the route of the vehicle 1 displayed along a road surface 5, as shown in FIG. 2. Namely, the first virtual image 311 is displayed in association with the road surface 5 which is the actual scene.

Note that, the first virtual image displayable area 310 may be provided inclined to about −5 degrees (angle inclined to CCW relative to the road surface 5 of FIG. 1) to +45 degrees (angle inclined to CW relative to the road surface 5 of FIG. 1) from the angle parallel to the road surface 5 of FIG. 1.

As shown in FIG. 1 and FIG. 2, the second virtual image displayable area 320 is an area which is virtually set as viewed from the viewer, and is referred to as the range capable of displaying a second virtual image 321. As shown in FIG. 1, the second virtual image displayable area 320 intersects the line of sight 4 of the viewer at a large angle compared to the first virtual image displayable area 310. The second virtual image displayable area 320 is substantially perpendicular to the road surface 5 as viewed from the viewer. Therefore, the second virtual image 321 is perpendicularly displayed on the road surface 5 in the second virtual image displayable area 320. In the present example, the second virtual image 321 displays vehicle information such as the speed of the vehicle 1 without being associated with the actual scene. The second virtual image 321 is provided in a position near the first virtual image 311 in consideration of the visibility.

As an example, the second virtual image displayable area 320 is provided in the front direction from the aforementioned eye box Eb, i.e., the position about 5 m to 10 m away from the traveling direction of the vehicle 1.

Note that, second virtual image displayable area 320 may also be provided inclined about ±10 degrees from the angle in a direction perpendicular to the road surface 5.

As stated above, the second virtual image displayable area 320 has a distance from the vehicle 1 close to that of the first virtual image displayable area 310. Therefore, when an attitude (for example, a pitch angle $\theta p$ to be described later) of the vehicle was changed, the turning radius connecting the vehicle 1 with the second virtual image displayable area 320 is small, thus, as viewed from the viewer, the second virtual image displayable area 320 shifts to a long distance compared to the first virtual image displayable area 310.

As shown in FIG. 1, an attitude detector 6 for detecting the attitude of the vehicle 1 is mounted in the vehicle 1. In the present example, the attitude detector 6 is constituted from a triaxle acceleration sensor. The attitude detector 6 detects the acceleration in the respective XYZ directions in the vehicle, and outputs these detection results to the HUD device 100 as vehicle attitude information G, to be precise, to a control unit 70 of the HUD device 100 which will be described later. The control unit 70 estimates the pitch angle $\theta p$ of the vehicle 1 by analyzing the detection results of the attitude detector 6. The control unit 70 periodically estimates the pitch angle $\theta p$ of the vehicle 1 by periodically acquiring the vehicle attitude information G.

As shown in FIG. 7 (*a*), FIG. 8(*a*) or FIG. 9(*a*), the pitch angle $\theta p$ refers to the angle in which the front direction 1*r* of the vehicle 1 faces toward the horizontal direction H as a reference. The pitch angle θp of the vehicle 1 changes due to various factors such as the acceleration and deceleration of the vehicle 1, the unevenness of the road surface 5, the air pressure variation of each tire of the vehicle 1.

For example, as shown in FIG. 8(*a*), when the vehicle 1 is inclined so that the front side of the vehicle 1 becomes higher than the rear side of the vehicle 1 in the front-rear direction (Z direction) of the vehicle 1, the pitch angle θp becomes a positive value. Further, as shown in FIG. 9(*a*), when the vehicle 1 is inclined so that the rear side of the vehicle 1 becomes higher than the front side of the vehicle 1 in the front-rear direction of the vehicle 1, the pitch angle θp becomes a negative value.

As shown in FIG. 3, the HUD device 100 comprises a first image display unit 10, a second image display unit 20, a reflector 30, a rotary drive unit 40 which is one example of the angle varying unit, a display synthesizer 50, a concave mirror 60, and the control unit 70.

The first image display unit 10 comprises, for example, a first projection unit 11 and a first screen 12.

The first projection unit 11 consists of a projector which uses, for example, a reflective display device such as a Digital Micromirror Device (DMD) and a Liquid Crystal On Silicon (LCOS). The first screen 12 is a transparent screen having, for example, a rectangular plate shape, and constituted from a holographic diffuser, a microlens array, a diffuser plate and the like. The first screen 12 is provided so that the longitudinal direction thereof is along the X direction.

The first projection unit 11 displays the first image 14 on the first screen 12 by emitting the projection light on the first screen 12 based on image data D1 input from the control unit 70. The first image 14 is the image corresponding to the aforementioned first virtual image 311. The first display light 210 showing the first image 14 is emitted to the reflector 30.

The second image display unit 20 comprises, for example, a second projection unit 21 constituted in the same manner as the first projection unit 11, and a second screen 22 constituted in the same manner as the first screen 12. The second image display unit 20 displays the second image 24 on the second screen 22 by emitting the projection light on the second screen 22 based on image data D2 input from the control unit 70. The second image 24 is the image corresponding to the aforementioned second virtual image 321. The second display light 220 showing the second image 24 is emitted to the display synthesizer 50.

As shown in FIG. 3, the reflector 30 is formed by, for example, a plane mirror, and is arranged inclined on the optical route of the first display light 210 from the first image display unit 10. The reflector 30 reflects the first display light 210 from the first image display unit 10 toward the display synthesizer 50.

The rotary drive unit 40 comprises, for example, a stepping motor or a Direct Current (DC) motor which are not illustrated, and a transmission mechanism for transmitting a rotational force from the motor to the reflector 30.

The rotary drive unit 40 rotates the reflecting unit 30 around the rotation axis AX extending in the X direction, i.e., the width direction of the vehicle 1 under the control of the control unit 70. In the present example, the rotation axis AX is positioned in the center of the reflector 30 in the Y direction. As shown in FIG. 1, by rotating the reflector 30, an angle α1 of the first virtual image displayable area 310 can be adjusted relative to the second virtual image displayable area 320.

As shown in FIG. 3, the display synthesizer 50 is constituted from a flat plane half mirror comprising, for example, a translucent substrate, and a semi-transmissive reflection layer such as a metal reflection film or a dielectric multilayer film formed on one surface of the substrate.

The display synthesizer 50 comprises a first surface 50*a* for reflecting the first display light 210 reflected by the reflector 30 toward the concave mirror 60, and a second surface 50*b* for receiving the second display light 220 from the second image 24 of the second screen 22. The display synthesizer 50 transmits the second display light 220 received through the second surface 50*b* to the first surface 50*a* side, and emits the transmitted second display light 220 toward the concave mirror 60. The transmittance of the display synthesizer 50 is 50% in the case of a half mirror, but may be appropriately adjusted to adjust the first and the second virtual images 311 and 321.

As shown in FIG. 3, the concave mirror 60 is arranged inclined on the optical route of the first and the second display lights 210 and 220 which passed through the display synthesizer 50, and reflects the first and the second display lights 210 and 220 which passed through the display synthesizer 50 toward the front windshield 2 (refer to FIG. 1). The concave mirror 60 has, for example, a function for enlarging the first and the second display lights 210 and 220 in cooperation with the front windshield 2, a function for correcting distortions of the first and the second virtual images 311 and 321 occurring due to the curved surface of the front windshield 2, and a function for forming the first and the second virtual images 311 and 321 at a position away from a viewer by a predetermined distance.

The optical route length of the first display light 210 from the first screen 12 to the concave mirror 60 is arranged so as to be longer than the optical route length of the second display light 220 from the second screen 22 to the concave mirror 60. Therefore, the first virtual image 311 corresponding to the first display light 210 is formed at a position farther from the eye box Eb than the second virtual image 321 corresponding to the second display light 220.

As shown in FIG. 4, the control unit 70 is connected to a bus 7 consisting of a Local Area Network (LAN) mounted on the vehicle 1, and vehicle information is acquired through the bus 7. The control unit 70 includes, for example, a processing unit 71, a storage unit 72 and an interface 73. The processing unit 71 comprises, for example, a Central Processing Unit (CPU) and a Random Access Memory (RAM). The storage unit 72 comprises, for example, a Read Only Memory (ROM). The interface 73 is constituted by an input/output communication interface connected by a bus 7.

The interface 73 acquires the vehicle information including the vehicle attitude information G through the bus 7. The data for generating image data D1 and D2 based on the vehicle information to be input, and data for generating the drive data T based on the vehicle attitude information G to be input is stored in the storage unit 72.

The processing unit 71 utilizes the data stored in the storage unit 72, while generating the image data D1 and D2 based on the vehicle information to be input, outputs the generated image data D1 to the first image display unit 10, and outputs the generated image data D2 to the second image display unit 20. Therefore, as stated above with reference to FIG. 3, the first image display unit 10 displays the first image 14 corresponding to the first virtual image 311 based on the image data D1 to be input. Further, the second image display unit 20 displays the second image 24 corresponding to the second virtual image 321 based on the image data D2 to be input.

Further, the processing unit 71 generates the drive data T based on the attitude information G to be input, and outputs the generated drive data T to the rotary drive unit 40. Therefore, the rotary drive unit 40 rotates the reflector 30 based on the drive data T.

Next, the contents of the control of the control unit 70 will be described.

The control unit 70 performs the virtual image angle adjustment process shown in the flowchart of FIG. 5 and the virtual image position change process shown in the flowchart of FIG. 6. The virtual image angle adjustment process and the virtual image position change process may be performed simultaneously, or may be performed in any order. These flowcharts are executed repeatedly, for example, during the period in which the ignition of the vehicle 1 is ON or during the traveling period of the vehicle 1. The virtual image angle adjustment process is a process for adjusting the angle α1 between the first and the second virtual image displayable areas 310 and 320. The virtual image position change process is a process for changing the position of the second virtual image 321 in the second virtual image displayable area 320 in order to decrease the misalignment of the relative positional relationship of the first and the second virtual images 311 and 321.

First, the virtual image angle adjustment process will be described with reference to the flowchart of FIG. 5.

The control unit 70 acquires the vehicle attitude information G (Step S101). Moreover, the control unit 70 generates the drive data T based on the acquired vehicle attitude information G, and rotates the reflector 30 through the rotary drive unit 40 by the drive data T so that the first virtual image displayable area 310 becomes parallel to the road surface 5 (Step S102). In the virtual image angle adjustment process, Step S101 and S102 are executed repeatedly. Therefore, regardless of the change of the pitch angle θp of the vehicle 1, the first virtual image displayable area 310 is maintained parallel to the road surface 5 by adjusting the angle α1 of the first virtual image displayable area 310 relative to the second virtual image displayable area 320.

Next, the virtual image position change process will be described with reference to the flowchart of FIG. 6.

The control unit 70 acquires the vehicle attitude information G (Step S201), and the pitch angle θp is estimated based on the vehicle attitude information G (Step S202). Moreover, the control unit 70 determines whether or not the estimated pitch angle θp is 0° (Step S203). If it is determined that the pitch angle θp is 0° (Step S203: YES), the control unit 70 displays the second virtual image 321 in the reference position P1 in the second virtual image displayable area 320 (Step S204). As shown in FIG. 7 (*d*), the reference position P1 is set in the center position of the Y direction in the second virtual image displayable area 320. Therefore, the process according to the flowchart is terminated.

Figure 12:
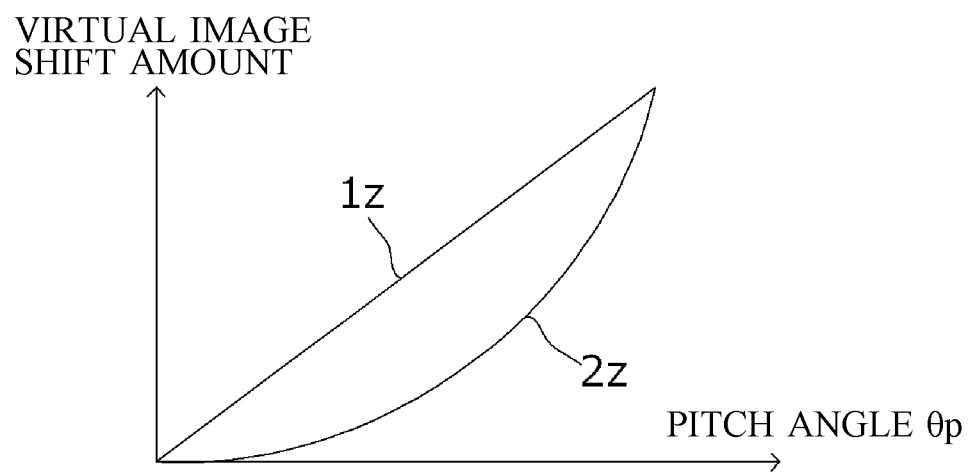
FIG. 12 is a graph illustrating the relationship between the pitch angle and the amount of shift of the second virtual image according to an embodiment of the present disclosure.

On the one hand, if the control unit 70 determines that the pitch angle θp is not 0° (Step S203: NO), it determines whether or not the pitch angle θp is a positive value (Step S205). If it is determined that the pitch angle θp is a positive value (Step S205: YES), the control unit 70 displays the second virtual image 321 in a lower position P2 in the second virtual image displayable area 320. As shown in FIG. 8(*d*), the lower position P2 is the position spaced downward from the reference position P1 in the Y direction as viewed from the viewer. Further, as shown in FIG. 12, the second virtual image 321 is shifted downward by a distance proportional to the pitch angle θp. This proportional relationship may be a linear function 1*z* or may be a quadratic function 2*z*. Furthermore, the proportional relationship may be a tertiary or higher function. Therefore, the process according to the flowchart is terminated.

Further, if it is determined that the pitch angle θp is not a positive value (Step S205: NO), the control unit 70 determines that the pitch angle θp is a negative value (Step S207). In this case, the control unit 70 displays the second virtual image 321 in an upper position P3 in the second virtual image displayable area 320 (Step S208). As shown in FIG. 9(*d*), the upper position P3 is the position spaced upward from the reference position P1 in the Y direction. At this time, as shown in FIG. 12, the second virtual image 321 is shifted upward by a distance proportional to the pitch angle θp. Therefore, the process according to the flowchart is terminated.

By repeatedly executing the flowchart, when the pitch angle θp increased, the second virtual image 321 shifts downward by a distance in accordance to the amount of increase, and when the pitch angle θp decreased, the second virtual image 321 shifts upward by a distance in accordance to the amount of increase.

Next, the operation mode of the HUD device 100 when the pitch angle θp was changed will be explained. Note that, as shown in FIG. 7 (*a*), FIG. 8(*a*) and FIG. 9(*a*), there is an H-V coordinate system which are coordinates independent of the XYZ coordinate system of the vehicle 1. The H-V coordinate system comprises a horizontal direction H, and a vertical direction V orthogonal to the horizontal direction H, and the H-V coordinate system does not incline regardless of the attitude of the vehicle 1.

For example, as shown in FIG. 7 (*a*), when the vehicle 1 has an attitude such that the front direction 1*r* is along the horizontal direction H, the pitch angle θp of the vehicle 1 becomes 0°. In this case, as shown in FIG. 7 (*b*), the reflector 30 is present on a reference angle β1. Therefore, when the reflector 30 is present on the reference angle β1, as shown in FIG. 7 (*c*), the first virtual image displayable area 310 is positioned so as to be along the road surface 5. At this time, the angle α1 between the first and the second virtual image displayable areas 310 and 320 is substantially 90°. Furthermore, at this time, as shown in FIG. 7 (*d*), the second virtual image 321 displays the reference position P1 in the second virtual image displayable area 320. Therefore, as shown in FIG. 2, the second virtual image 321 is provided in a position near the first virtual image 311 in consideration of the visibility. Further, as shown in FIG. 7 (*c*), when the pitch angle θp of the vehicle 1 is 0°, the distance between the first and the second virtual image displayable areas 310 and 320 in the vertical direction V is a first distance B1.

For example, as shown in FIG. 8(*a*), when the vehicle 1 has an attitude such that the front direction 1*r* faces obliquely upward as viewed from the viewer, the pitch angle θp of the vehicle 1 becomes a positive value. At this time, as shown in FIG. 8(*c*), the road surface 5 will be along the horizontal direction H. In this case, as shown in FIG. 8(*b*), the reflector 30 is positioned on a rotation angle β2 through the rotary drive unit 40 under the control of the control unit 70. This rotation angle β2 is at a position in which the reflector 30 on the reference angle β1 is rotated clockwise (CW direction) around the rotation axis AX. Namely, the reflector 30 on the rotation angle β2 is closer to the angle along the Z direction than the reflector 30 on the reference angle β1. By rotating the reflector 30 in the CW direction, the first virtual image displayable area 310 is rotated so that the angle α1 between the second virtual image displayable area 320 becomes large, as shown in the arrow E of FIG. 8(*c*). Therefore, even when the pitch angle θp of the vehicle 1 was a positive value, by the reflector 30 being on the rotation angle β2, the first virtual image displayable area 310 and the first virtual image 311 are along the road surface 5.

Figure 10:
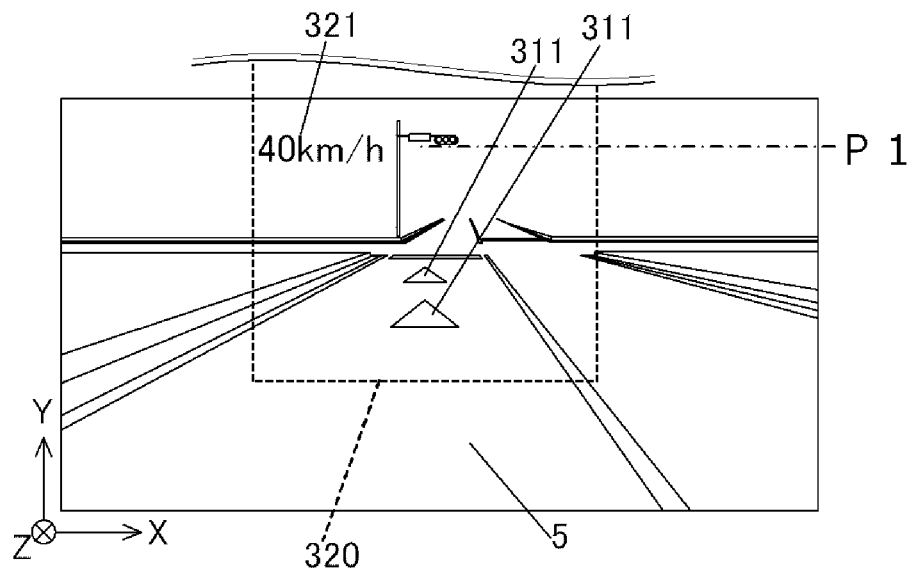
FIG. 10 (*a*) is a front elevation view illustrating the position of the second virtual image in a second virtual image displayable area when the pitch angle of the vehicle is a positive value according to a comparative example to the first embodiment of the present disclosure, and FIG. 10 (*b*) is a front elevation view illustrating the position of the second virtual image in a second virtual image displayable area when the pitch angle of the vehicle is a negative value.
Figure 10:
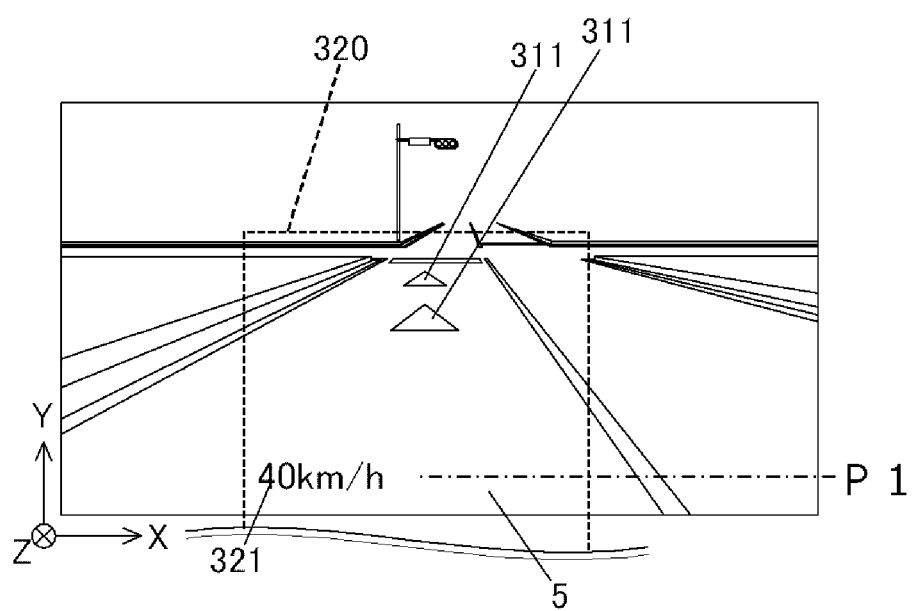

The second virtual image displayable area 320 is securely positioned in the vehicle 1, thus, when the pitch angle θp of the vehicle 1 is a positive value, the second virtual image displayable area 320 shifts upward as viewed from the viewer due to the vehicle itself being inclined, and, the first virtual image displayable area 310 shifts downward as viewed from the viewer so that the angle α1 becomes large. Therefore, as shown in FIG. 8(c), the distance between the first and the second virtual image displayable areas 310 and 320 in the vertical direction V is a second distance B2 which is longer than the aforementioned first distance B1. The second distance B2 becomes longer as the pitch angle θp of the vehicle 1 increases. Therefore, as shown in the comparative example of FIG. 10(a) different than the present embodiment, when the position of the second virtual image 321 in the second virtual image displayable area 320 is fixed, the second virtual image 321 in the second virtual image displayable area 320 is positioned above the first virtual image 311. Therefore, in this comparative example, there is concern that the line of sight movement distance becomes long when visually recognizing the first and the second virtual images 311 and 321.

Figure 11:
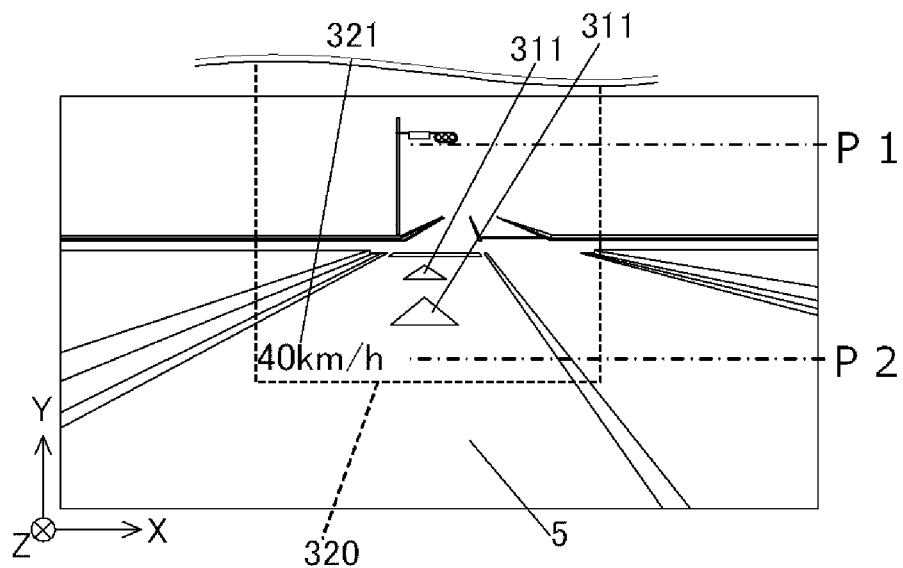
FIG. 11 (*a*) is a front elevation view illustrating the position of the second virtual image in a second virtual image displayable area when the pitch angle of the vehicle is a positive value according to an embodiment of the present disclosure, and FIG. 11 (*b*) is a front elevation view illustrating the position of the second virtual image in a second virtual image displayable area when the pitch angle of the vehicle is a negative value.
Figure 11:
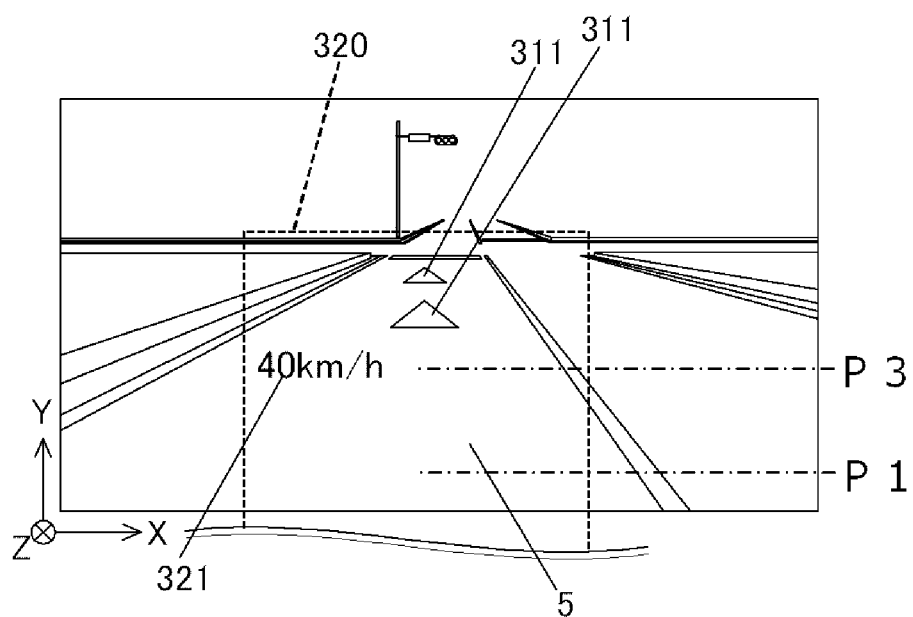

In the present embodiment, as shown in FIG. 8(c), when the first virtual image displayable area 310 was rotated so that the angle α1 to become large, the second virtual image 321 is displayed in the lower position P2 in the second virtual image displayable area 320, as shown in FIG. 8(d). Therefore, even if the positional relationship of the first and the second virtual image displayable areas 310 and 320 changes, the positional misalignment of the second virtual image 321 decreases relative to the first virtual image 311, as shown in FIG. 11(a). Therefore, these prevent the line of sight movement distance from becoming long when visually recognizing the first and the second virtual images 311 and 321.

For example, as shown in FIG. 9(a), when the vehicle 1 has an attitude such that the front direction 1r faces obliquely downward as viewed from the viewer, the pitch angle θp of the vehicle 1 becomes a negative value. At this time, as shown in FIG. 9(c), the road surface 5 will be along the horizontal direction H. In this case, as shown in FIG. 9(b), the reflector 30 is positioned on a rotation angle ß3 through the rotary drive unit 40 under the control of the control unit 70. This rotation angle ß3 is at a position in which the reflector 30 on the reference angle ß1 is rotated counterclockwise (CCW direction) around the rotation axis AX. Namely, the reflector 30 on the rotation angle ß3 is closer to the angle along the Y direction than the reflector 30 on the reference angle ß1. By rotating the reflector 30 in the CCW direction, the first virtual image displayable area 310 is rotated so that the angle α1 between the second virtual image displayable area 320 becomes small as shown by the arrow F in FIG. 9(c). Therefore, even when the pitch angle θp of the vehicle 1 was a negative value, by the reflector 30 being on the rotation angle ß3, the first virtual image displayable area 310 is along the road surface 5.

The second virtual image displayable area 320 is securely positioned in the vehicle 1, thus, when the pitch angle θp of the vehicle 1 is a negative value, the second virtual image displayable area 320 shifts downward as viewed from the viewer due to the vehicle itself being inclined, and, the first virtual image displayable area 310 shifts upward as viewed from the viewer so that the angle α1 becomes small. Therefore, as shown in FIG. 9(c), the distance between the first and the second virtual image displayable areas 310 and 320 in the vertical direction V is a third distance B3 which is shorter than the aforementioned first distance B1. This third distance B3 becomes shorter as the pitch angle θp of the vehicle 1 decreases. Therefore, as shown in the comparative example of FIG. 10(b) which is different than the present embodiment, when the position of the second virtual image 321 in the second virtual image displayable area 320 is fixed, the second virtual image 321 in the second virtual image displayable area 320 is positioned below the first virtual image 311. Therefore, in the comparative example, there is concern that the line of sight movement distance becomes long when visually recognizing the first and the second virtual images 311 and 321.

In the present embodiment, as shown in FIG. 9(c), when the first virtual image displayable area 310 was rotated so that the angle α1 becomes small, the second virtual image 321 is displayed in the upper position P3 in the second virtual image displayable area 320, as shown in FIG. 9(d). Therefore, even if the positional relationship of the first and the second virtual image displayable areas 310 and 320 changes, the positional misalignment of the second virtual image 321 decreases relative to the first virtual image 311, as shown in FIG. 11(b). Therefore, these prevent the line of sight movement distance from becoming long when visually recognizing the first and the second virtual images 311 and 321.

(Effects)

The above described embodiment bring about the following effects.

(1) A HUD device 100 displays a first virtual image 311 in a first virtual image displayable area 310, and displays a second virtual image 321 in a second virtual image displayable area 320. The HUD device 100 comprises a rotary drive unit 40 for changing an angle α1 formed by the first virtual image displayable area 310 and the second virtual image displayable area 320 by rotating the reflector 30, and a control unit 70 comprising a virtual image angle adjustment process for adjusting the angle α1 through the rotary drive unit 40, and a virtual image position change process for changing the position of the second virtual image 321 in the second virtual image displayable area 320 in order to suppress the misalignment of the relative positional relationship of the first and the second virtual images 311 and 321 when performing the virtual image angle adjustment process.

According to this configuration the misalignment of the actual scene and the first and the second virtual image displayable areas 310 and 320 can be suppressed by changing the angle α1 formed by the first virtual image displayable area 310 and the second virtual image displayable area 320 by the virtual image angle adjustment process. Further, when performing the virtual image angle adjustment process, a misalignment of the relative positional relationship of the first and the second virtual images 311 and 321 is suppressed by changing the position of the second virtual image 321 in the second virtual image displayable area 320 by the virtual image position change process. As stated above, the HUD device 100 can display the first and the second virtual images 311 and 321 which is more suitable for the actual scene.

Further, even when the pitch angle θp was changed, the separation of the first and the second virtual images 311 and 321 is suppressed, thus, the line of sight movement distance of the viewer can be reduced when visually recognizing the first and the second virtual images 311 and 321.

(2) The HUD device 100 is mounted on a vehicle 1. The vehicle 1 is provided with an attitude detector 6 for detecting the attitude of the vehicle 1. When the attitude detected by the attitude detector 6, for example, the pitch angle θp changed, the control unit 70 changes the angle α1 in the virtual image angle adjustment process to thereby cause the first virtual image displayable area 310 to be along the road surface 5 in the actual scene, and changes the position of the second virtual image 321 in the second virtual image displayable area 320 in order to suppress the misalignment of the relative positional relationship of the first and the second virtual images 311 and 321 in the virtual image position change process.

According to this configuration, when the first virtual image displayable area 310 is along the road surface 5 which is in the actual scene, the misalignment of the relative positional relationship of the first and the second virtual images 311 and 321 is suppressed by changing the angle α1 in the virtual image angle adjustment process.

(3) The attitude detector 6 detects the pitch angle θp of the vehicle 1 as the attitude of the vehicle 1, and when the pitch angle θp detected by the attitude detector 6 increased, the control unit 70 shifts in the downward direction the position of the second virtual image 321 in the second virtual image displayable area 320 as viewed from the viewer in the virtual image position change process.

According to this configuration, when the pitch angle θp increases, the second virtual image displayable area 320 is shifted upward relative to the first virtual image displayable area 310 as viewed from the viewer. In this case, the misalignment of the relative positional relationship of the first and the second virtual images 311 and 321 is suppressed by shifting the position of the second virtual image 321 in the downward direction in the second virtual image displayable area 320 as viewed from the viewer.

(4) The attitude detector 6 detects the pitch angle θp of the vehicle 1 as the attitude of the vehicle 1, and when the pitch angle θp detected by the attitude detector 6 decreased, the control unit 70 shifts in the upward direction the position of the second virtual image 321 in the second virtual image displayable area 320 as viewed from the viewer in the virtual image position change process.

In this configuration, when the pitch angle θp decreases, the second virtual 16 image displayable area 320 is shifted in the downward direction relative to the first virtual image displayable area 310 as viewed from the viewer. In this case, the misalignment of the relative positional relationship of the first and the second virtual images 311 and 321 is suppressed by shifting the position of the second virtual image 321 in the upward direction in the second virtual image displayable area 320 as viewed from the viewer.

(5) The control unit 70 determines the amount of shift of the second virtual image 321 in the virtual image position change process in accordance with an amount of increase or an amount of decrease of the pitch angle θp detected by the attitude detector 6.

According to this configuration, the misalignment of the relative positional relationship of the first and the second virtual images 311 and 321 is more accurately suppressed.

(Modified Example)

Note that, the aforementioned embodiment may be carried out by the modes below in which this configuration has been appropriately modified.

In the aforementioned embodiment, the attitude detector 6 was constituted from a triaxle acceleration sensor, but the attitude detector 6 may also be a uniaxle or a biaxle acceleration sensor. Furthermore, the attitude detector 6 is not limited to an acceleration sensor, and the pitch angle θp of the vehicle 1 may be obtained using a known sensor and analysis method. For example, the attitude detector 6 may be constituted by a height sensor (not illustrated) arranged in the vicinity of a suspension of the vehicle 1. The height sensor detects the height of the vehicle 1 from the ground. At this time, the control unit 70 estimates the pitch angle θp of the vehicle 1 by analyzing the detection results of the height sensor.

Further, the attitude detector 6 may also be an imaging camera (not illustrated) for imaging the outside of the vehicle 1. In this case, the control unit 70 may estimate the pitch angle θp of the vehicle 1 from the actual scene imaged by the imaging camera.

Further, the attitude detector 6 may estimate the pitch angle θp of the vehicle 1 by the acceleration or the deceleration of the vehicle 1. Further, the attitude detector 6 may estimate the pitch angle θp of the vehicle 1 based on the air pressure of each tire of the vehicle 1.

In any of the aforementioned examples, the pitch angle θp of the vehicle 1 was estimated by the control unit 70, but the processing unit for performing this estimation process may be constituted as a part of the attitude detector 6.

In the aforementioned embodiment, the control unit 70 of the HUD device 100 rotated the first virtual image displayable area 310 so as to be along the road surface 5 and adjusted the position of the second virtual image 321 in the second virtual image displayable area 320 in accordance with the change of the attitude of the vehicle 1 (for example, the pitch angle θp), but the control unit 70 of the HUD device 100 may also rotate the second virtual image displayable area 320 so as to become substantially perpendicular relative to the road surface 5 and may adjust the position of the first virtual image 311 in the first virtual image displayable area 310. In this case, the control unit 70 shifts in the downward direction the position of the first virtual image 311 in the first virtual image displayable area 310 when the pitch angle θp increased. Further, the control unit 70 shifts in the upward direction the position of the first virtual image 311 in the first virtual image displayable area 310 when the pitch angle θp decreased. Therefore, the misalignment of the positional relationship of the first and the second virtual images 311 and 321 is suppressed.

Further, the control unit 70 may adjust the position of both of the first and the second virtual images 311 and 321 in accordance with the change of the pitch angle θp of the vehicle 1.

In the aforementioned embodiment, the reflector 30 was a plane mirror, but the reflector 30 may also be a concave mirror.

In the aforementioned embodiment, the attitude detector 6 was provided on the outside of the HUD device 100, but the attitude detector 6 may also be provided on the inside of the HUD device 100.

In the aforementioned embodiment, the control unit 70 acquired the detection effect of the attitude detector 6 through the bus 7, but the detection effect of the attitude detector 6 may be acquired directly.

In the aforementioned embodiment, the control unit 70 changed the position of the second virtual image 321 based on the pitch angle θp of the vehicle 1 detected by the attitude detector 6, but the position of the first and the second virtual images 311 and 321 may also be changed based on the yawing angle or the rolling angle which is the attitude of the vehicle 1 detected by the attitude detector 6.

In the aforementioned embodiment, the control unit 70 of the HUD device 100 changes the angle α1 of the first virtual image displayable area 310 relative to the second virtual image displayable area 320 by rotating the reflector 30 through the rotary drive unit 40, but the angle α1 of the first virtual image displayable area 310 may also be changed relative to the second virtual image displayable area 320 by rotating the first screen 12. In this case, the reflector 30 may be constituted to be rotatable, or may be constituted to not be rotatable. Furthermore, the control unit 70 may rotate the second screen 22. In this case, the angles with respect to the actual scenes of both of the first and the second virtual image displayable areas 310 and 32 may be respectively adjusted, and the angle α1 between the first and the second virtual image displayable areas 310 and 320 may be adjusted by making the angle adjustment amounts different.

Further, the control unit 70 may rotate the display synthesizer 50. Even in this case, the angle α1 of the first virtual image displayable area 310 can be adjusted relative to the second virtual image displayable area 320.

Further, the rotation axis for rotating the first and the second screens 12 and 22, the reflector 30 and the display synthesizer 50 is not limited to the center, and may be at any position, for example, there may be a rotation axis at the end portion. Further, the direction in which the rotation axis extends is not limited to the X direction, but may extend in any direction.

In the aforementioned embodiment, the control unit 70 of the HUD device 100 adjusted the angle α1 between the first and the second virtual image displayable areas 310 and 320 and the position of the second virtual image 321 in the second virtual image displayable area 320 on the occasion of the change of the attitude of the vehicle 1. However, the control unit 70 may perform these adjustments regardless of the attitude of the vehicle 1. For example, when the vehicle 1 is positioned on a flat road surface, but the front of the vehicle 1 is uphill or downhill, the control unit 70 may adjust the angle α1 in accordance with the uphill or downhill, and may adjust the position of the second virtual image 321 in the second virtual image displayable area 320.

Furthermore, the control unit 70 may make adjustments on the occasion of inputting a predetermined signal through the bus 7, inputting predetermined information from the outside of the vehicle 1, or changing the display contents of the first and the second virtual images 311 and 321. Specifically, for example, the angle α1 between the first and the second virtual image displayable areas 310 and 320 and the position of the second virtual image 321 in the second virtual image displayable area 320 may be adjusted on the occasion when an abnormality occurs in the vehicle 1 or a recommended route is input from an outside vehicle network.

In the aforementioned embodiment, the control unit 70 was on the inside of the HUD device 100, but some or all of its functions may be provided in the vehicle 1 outside the HUD device 100.

In the aforementioned embodiment, the first and the second image display units 10 and 20 may be, for example, a transmissive display panel such as a liquid crystal display element, a self-emitting display panel such as an organic EL element or a scanning display device for scanning a laser beam, or the like.

In the aforementioned embodiment, the HUD device 100 comprises the first and the second image display units 10 and 20, but either unit may be omitted. In this case, the HUD device 100 comprises a bifocal mirror for receiving the light from a single image display unit and emitting the first and the second display lights 210 and 220 having different focal lengths (imaging distances). Therefore, the first and the second virtual images 311 and 321 can be displayed at different distances from the viewer by the single image display unit.

In the aforementioned embodiment, the control unit 70 may change the position and the size of the area to be used 13 capable of displaying the first image 14 on the first screen 12 in accordance with the change of the pitch angle θp of the vehicle 1. Therefore, when the angle α1 of the first virtual image displayable area 310 was adjusted relative to the second virtual image displayable area 320, the misalignment of the first virtual image displayable area 310 relative to the actual scene of the vertical direction as viewed from the viewer is suppressed.

Figure 13:
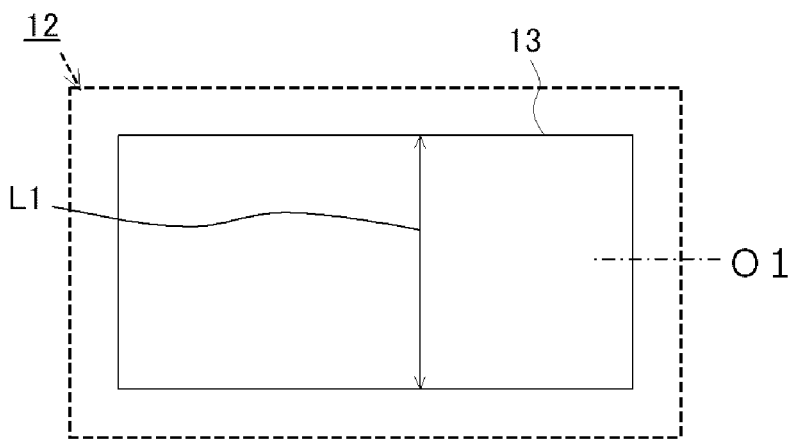
FIG. 13 (*a*) is a front elevation view of a first screen illustrating an area to be used when a pitch angle of the vehicle is 0° according to a modified example of the present disclosure, FIG. 13 (*b*) is a front elevation view of a first screen illustrating an area to be used when a pitch angle of the vehicle is a positive value, and FIG. 13 (*c*) is a front elevation view of a first screen illustrating an area to be used when a pitch angle of the vehicle was a negative value.
Figure 13:
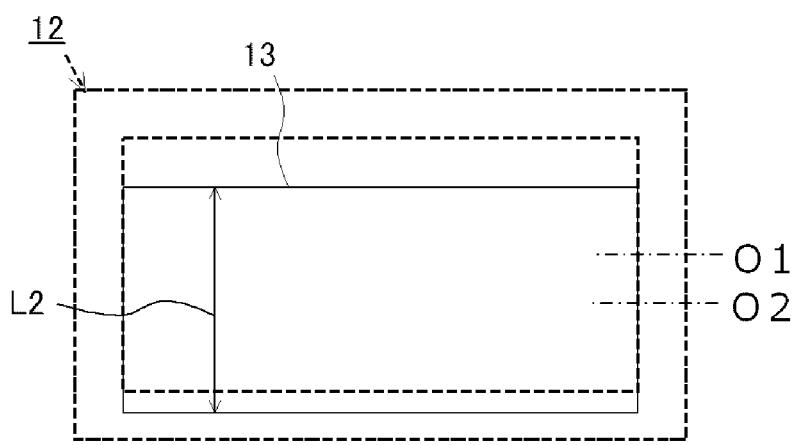
Figure 13:
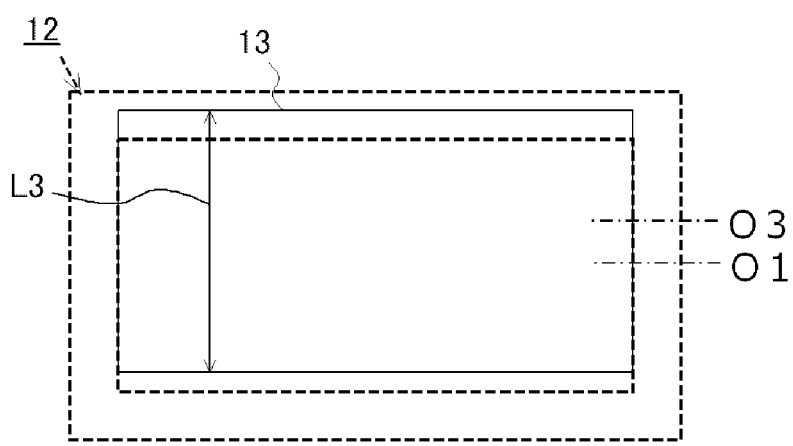

Specifically, as shown in FIG. 13(a), when the pitch angle θp of the vehicle 1 is 0°, the control unit 70 sets the area to be used 13 in a reference position O1 positioned at the center of the first image 14.

Further, as shown in FIG. 13(b), when the pitch angle θp of the vehicle 1 is a positive value, the control unit 70 sets the area to be used 13 in a lower position O2 positioned below the reference position O1. The larger the pitch angle θp of the vehicle 1 becomes, the further away the lower position O2 is positioned from the reference position O1. Furthermore, a length L2 in the Y direction of the area to be used 13 in the lower position O2 is set to be smaller than a length L1 in the Y direction of the area to be used 13 in the reference position O1. As shown in FIG. 14, the area to be used 13 in the lower position O2 is positioned on the viewer side of the Z direction of the vehicle 1 on the upper side of the vertical direction V, and, the length in the horizontal direction H becomes shorter compared to the area to be used 13 in the reference position O1.

Further, as shown in FIG. 13(c), when the pitch angle θp of the vehicle 1 is a negative value, the control unit 70 sets the area to be used 13 in an upper position O3 positioned above the reference position O1. The smaller the pitch angle θp of the vehicle 1 becomes, the further away the upper position O3 is positioned from the reference position O1. Furthermore, a length L3 in the Y direction of the area to be used 13 in the upper position O3 is set to be larger than the length L1 in the Y direction of the area to be used 13 in the reference position O1. As shown in FIG. 14, the area to be used 13 in the upper position O3 is positioned on the side farther from the viewer in the Z direction of the vehicle 1 on the lower side in the vertical direction V, and, the length in the horizontal direction H becomes longer compared to the area to be used 13 in the reference position O1.

As stated above, as shown in FIG. 14, the area to be used 13 of the first screen 12 can be set in the range from the position 5a to the position 5b of the road surface 5 regardless of the change of the pitch angle θp of the vehicle 1.

The aforementioned embodiment discloses only the example in which the control unit 70 shifts the position of the second virtual image 321 in the second virtual image displayable area 320 only when the angle α1 was changed, but it is not limited thereto. For example, when the vehicle 1 enters an uphill or downhill which continues at the same inclination, the first virtual image displayable area 310 can be made to follow the uphill or downhill in front of the vehicle 1 without changing the angle α1. In this case, the control unit 70 is adjusted in order to maintain the angle α1, and in the uphill case, may shift the second virtual image 321 downwards, and in the downhill case, may shift the second virtual image 321 upwards.

In the aforementioned embodiment, the first virtual image displayable area 310 was associated with the road surface 5 in the actual scene, and the second virtual image displayable area 320 was not associated with the actual scene, but may be associated with the actual scene in the second virtual image displayable area 320. For example, the second virtual image displayable area 320 can be provided so as to be along the road surface 5. In this case, for example, an arrow or an icon along the road surface 5 can be displayed as the second virtual image 321.

In the aforementioned embodiment, the HUD device 100 was mounted in the vehicle 1, but it may also be mounted in a conveyance such as an airplane or a ship. Furthermore, the HUD device 100 may be mounted on an eyeglass-type wearable terminal.

Further, in the aforementioned embodiment, the HUD device 100 emitted the first and the second display lights 210 and 220 to the front windshield 2, but it is not limited to the front windshield 2, but may emit the first and the second display lights 210 and 220 to a dedicated combiner.

DESCRIPTION OF REFERENCE NUMERALS

1 vehicle
1 *r* front direction
2 front windshield
3 dashboard
4 line of sight
5 road surface
6 attitude detector
10 first image display unit
11 first projection unit
12 first screen
14 first image
15 second image display unit
21 second projection unit
22 second screen
24 second image
30 reflector
40 rotary drive unit
50 display synthesizer
60 concave mirror
70 control unit
71 processing unit
72 storage unit
73 interface
100 HUD device
200 display light
210 first display light
220 second display lights
310 first virtual image displayable area
320 second virtual image displayable area
311 first virtual image
321 second virtual image
α1 angle
ß1 reference angle
ß2 and ß3 rotation angles
G vehicle attitude information
H horizontal direction
V vertical direction
O1 and P1 reference position
O2 and P2 lower position
O3 and P3 upper position
T drive data
AX rotation axis
Eb eye box
Θp pitch angle

The invention claimed is:

1. A head up display device for a vehicle, displaying a first virtual image in a first virtual image displayable area, and displaying a second virtual image in a second virtual image displayable area, the head up display device comprising:
   an angle varying unit for changing an angle formed between the first virtual image displayable area and the second virtual image displayable area, the angle varying unit being configured to adjust an inclination of the first virtual image displayable area relative to the second virtual image displayable area to change the angle; and
   a control unit for performing a virtual image angle adjustment process for adjusting the angle through the angle varying unit, and a virtual image position change process for changing at least one of a position of the first virtual image in the first virtual image displayable area and a position of the second virtual image in the second virtual image displayable area in order to suppress a misalignment of a relative positional relationship of the first virtual image and the second virtual image when performing the virtual image angle adjustment process.

2. The head up display device according to claim 1 mounted on a vehicle comprising an attitude detector for detecting an attitude of the vehicle, wherein
   the control unit changes the angle in the virtual image angle adjustment process to thereby cause the first virtual image displayable area to be along a road surface in an actual scene when the attitude detected by the attitude detector was changed, and changes the position of the second virtual image in the second virtual image displayable area extending along a direction intersecting the road surface in order to suppress the misalignment of the relative positional relationship of the first virtual image and the second virtual image in the virtual image position change process.

3. The head up display device according to claim 2, wherein
   the attitude detector detects a pitch angle of the vehicle as the attitude of the vehicle, and
   when the pitch angle detected by the attitude detector increased, the control unit shifts in a downward direction the position of the second virtual image in the second virtual image displayable area as viewed from a viewer in the virtual image position change process.

4. The head up display device according to claim 2, wherein
   the attitude detector detects a pitch angle of the vehicle as the attitude of the vehicle, and
   when the pitch angle detected by the attitude detector decreased, the control unit shifts in an upward direction the position of the second virtual image in the second virtual image displayable area as viewed from a viewer in the virtual image position change process.

5. The head up display device according to claim 3, wherein
   the control unit determines an amount of shift of the second virtual image in the virtual image position change process in accordance with an amount of increase or an amount of decrease of the pitch angle detected by the attitude detector.

6. The head up display device according to claim 3, wherein
   when the pitch angle detected by the attitude detector decreased, the control unit shifts in an upward direction the position of the second virtual image in the second virtual image displayable area as viewed from the viewer in the virtual image position change process.

7. The head up display device according to claim 4, wherein
   the control unit determines an amount of shift of the second virtual image in the virtual image position change process in accordance with an amount of increase or an amount of decrease of the pitch angle detected by the attitude detector.

* * * * *